March 4, 1969     A. A. DESPAIN ET AL     3,430,982
SELF-PROPELLED HARVESTING VEHICLE
Filed Sept. 27, 1967
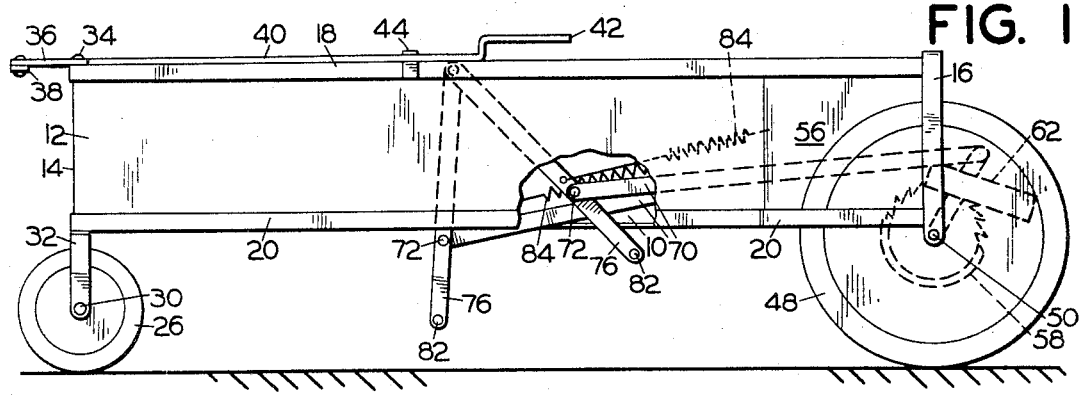
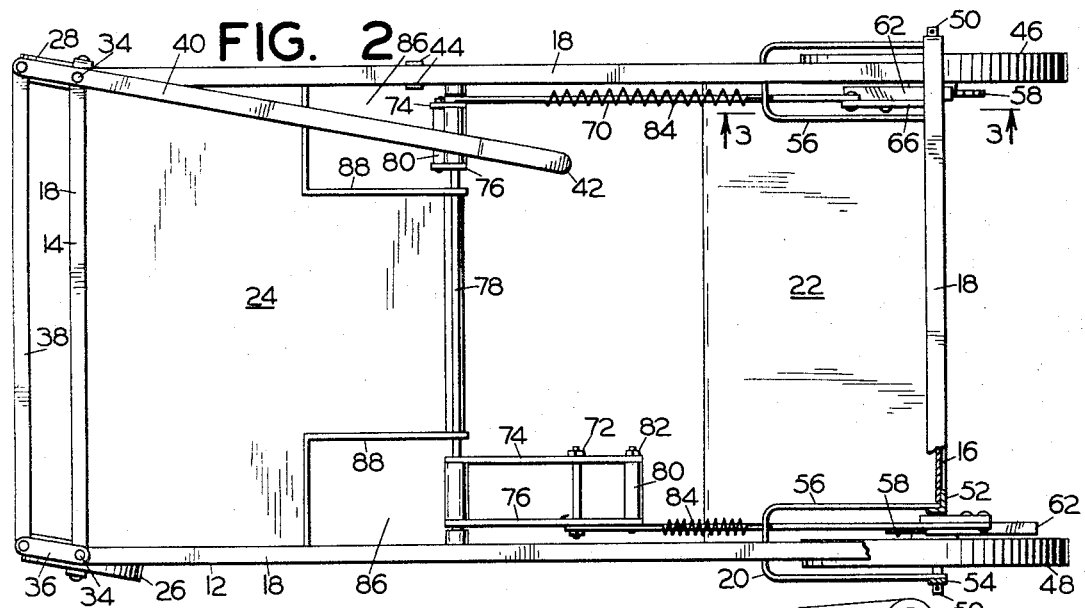
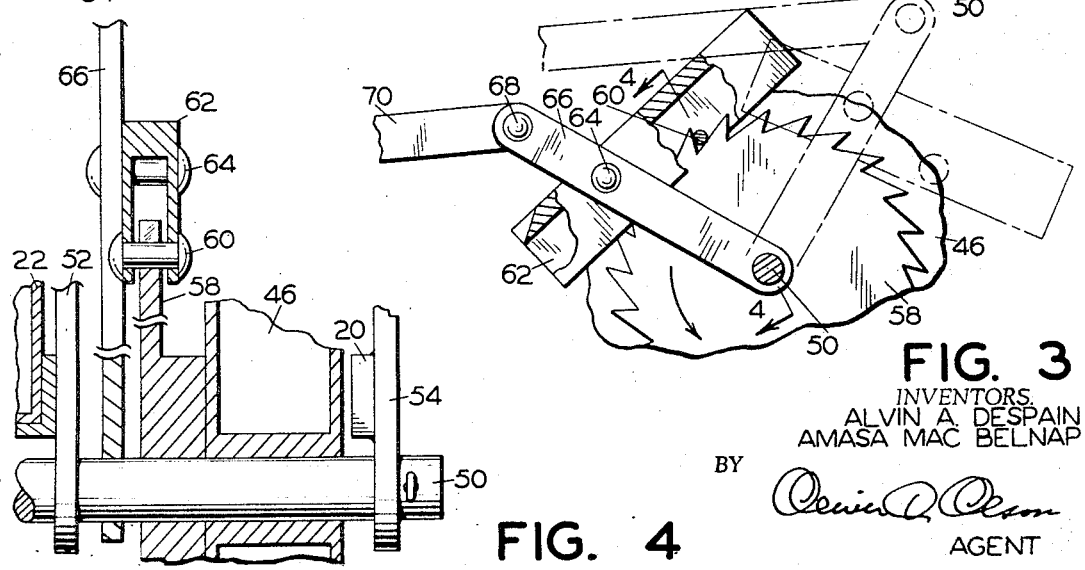
INVENTORS.
ALVIN A. DESPAIN
AMASA MAC BELNAP
BY
AGENT United States Patent Office 3,430,982
Patented Mar. 4, 1969

3,430,982
SELF-PROPELLED HARVESTING VEHICLE
Alvin A. Despain and Amasa Mac Belnap, both of 4152 Stortz Ave. NE., Salem, Oreg. 97303
Filed Sept. 27, 1967, Ser. No. 670,999
U.S. Cl. 280—255    4 Claims
Int. Cl. B62m 1/04, 5/00; F16h 27/02

ABSTRACT OF THE DISCLOSURE

A vehicle body having a seat at its rearward end, a produce supporting platform at its forward end and an intermediate open space through which to reach garden produce, is supported upon front steering wheels and upon driven rear wheels. A ratchet type sprocket on each rear wheel is releasably engageable by a driving pawl carried by an arm connected pivotally to a lever which is actuated through a link connection by a foot pedal.

Background of the invention

This invention relates to self-propelled vehicles, and more particularly to a vehicle for servicing and harvesting low growing crops such as strawberries.

Vehicles have been provided heretofore for supporting a person in position for servicing and harvesting garden crops, but such vehicles are characterized by certain deficiencies. A primary deficiency of such vehicles resides in their limited maneuverability over soft ground. Such vehicles as have been provided with manually powered drive mechanisms are movable through soft ground only with the application of substantial force, thereby taxing unduly the physical capabilities of the operator. Vehicles of the type provided with motive power are quite costly and therefore are not economically practicable.

Summary of the invention

In its basic concept the self-propelled vehicle of the present invention serves to position the operator comfortably for convenient access to the crop for servicing and harvesting, and utilizes a ratchet type drive mechanism which enable the operator to propel the vehicle over the soft ground with a minimum of effort.

It is the principal object of the present invention to provide a self-propelled vehicle of the class described which is of simplified and economical construction for general use in servicing and harvesting low growing crops such as strawberries.

The foregoing and other objects and advantages of the present invention will appear from the following detailed description, taken in connection with the accompanying drawing of the preferred embodiment.

Brief description of the drawing

FIG. 1 is a view in side elevation of a self-propelled produce harvesting vehicle embodying the features of this invention.

FIG. 2 is a plan view of the vehicle shown in FIG. 1.

FIG. 3 is a fragmentary sectional view taken on the line 3—3 in FIG. 2 showing in full and phantom lines two different positions of adjustment of the ratchet drive pawl assembly.

FIG. 4 is a fragmentary sectional view taken on the line 4—4 in FIG. 3.

Description of the preferred embodiment

The self-propelled vehicle illustrated in the drawing includes a body defined by the side walls 10, 12 and interconnecting front wall 14 and rear wall 16. The body preferably is formed of vertically spaced horizontal angle irons 18 and 20 between which are secured wooden or other suitable types of panels which form the walls. Supported between the bottom side angle irons 20 adjacent the rear wall is a seat 22 upon which to support the operator. A produce supporting shelf 24 is supported between the bottom side angle irons adjacent the front wall, and terminates a considerable distance forwardly of the seat. The longitudinally spaced relationship of the seat and shelf thus provides an intermediate opening for the legs and feet of the operator, while also exposing the ground and plants for servicing and harvesting.

The front end of the body is supported upon laterally spaced steering wheels 26 and 28. Each wheel is mounted for rotation on a shelf 30 supported at the lower end of a U-shaped yoke 32. The closed upper end of each yoke is secured to the lower end of a rod 34 which extends freely through vertically aligned openings at the front corners of the angle irons 18 and 20. The steering wheels thus are rotatable on the vertical axes of the rods. A lever 36 is secured at one end to the upper end of rod 34 associated with wheel 26. The opposite end of the lever is connected pivotally through the transverse link 38 to the forward end of the tiller lever 40. This tiller lever is secured intermediate its ends to the rod 34 associated with wheel 28. The rearward end of the tiller lever is provided with a hand grip 42 to facilitate its manipulation.

A pair of bars 44 are secured one on each of the opposite sides of the body side wall 10 and project slightly above the latter, to releasably confine the tiller lever between them. In this position of the tiller lever the steering wheels are positioned parallel to the longitudinal axis of the body, thereby providing for movement of the vehicle in the longitudinal direction of the latter. The tiller lever is sufficiently resilient to be lifted over the upper ends of the bars when it is desired to turn the wheels.

The rear end of the body is supported upon laterally spaced rear drive wheels 46 and 48. Each of the rear wheels is supported for rotation on a shaft 50 extending between a pair of laterally spaced vertical frame members 52 and 54 of the body. Although a single shaft 50 may be provided for both rear wheels, it is preferred that separate shafts be utilized so that each rear wheel be driven independently of the other. The side panels of the body terminate forwardly of the rear wheels, and the rearward portions of the bottom side angle irons 20 are offset laterally outward to extend along the outer sides of the wheels. Internal wheel guards 56 are provided between the rear wall and the rearward ends of the side panels, to protect the operator from the wheels and the drive mechanism associated therewith.

To each of the rear wheels, or to the mounting shaft 50 thereof, is secured a sprocket wheel 58 of the ratchet type, positioned closely adjacent the inner side of each wheel. Associated with each sprocket wheel is a pawl 60 which is mounted in a U-shaped arm 62 and traverses the space between the sides of the latter adjacent the open side. This U-shaped arm overlies the sprocket and is connected pivotally, by means of the pivot pin 64, to a lever 66 intermediate the ends of the latter. One end of the lever is journaled on the shaft 50 for rotation relative thereto, and the opposite end of the lever is connected pivotally, by means of the pivot pin 68, to the rearward end of an elongated link 70. The forward end of the link is connected pivotally, by means of the pivot bolt 72, to a stirrup type foot lever, intermediate the ends of the latter.

Each foot lever includes a pair of laterally spaced lever arms 74 and 76 supported pivotally at their upper ends on a transverse rod 78 which is mounted between the top side angle irons 18 of the body. The lower ends of the arms are secured together in spaced relation by means of the foot piece 80 which is interposed between the arms and secured thereto by means of the bolt 82.

The foot levers normally are biased resiliently to their rearward position of pivotal movement, by such means as the elongated spring 84. The spring is connected at one end to the lever 74 and at the opposite, rearward end to the vehicle body, for example to the forward end of the wheel guard 56. Thus, the foot levers may be pivoted forwardly by application of leg pressure, with the operator's feet resting on the foot pieces. Upon release of such pressure the springs function to pivot the foot levers to their normal rearward position.

The rearward lateral side portions of the shelf 24 are cut away to provide openings 86 for the feet of the operator for manipulating the foot levers. Internal guards 88 surround these openings and are supported at their upper ends on the transverse rod 78, whereby to support the rearward end of the shelf.

Each sprocket wheel 58 is of the ratchet type in which the teeth are shaped to provide positive engagement of the pawl 60 in the driving direction and to allow the pawl to release in the retracting direction of the arm 62.

It is to be noted that the pawl support arm 62 is pivoted to the lever 66 at a point 64 forwardly of the longitudinal center of balance of the arm, and that the pawl 60 is located rearwardly of the pivot 64. The arm thus tends to rotate clockwise about the pivot gravitationally, to position the pawl for engagement with the sprocket wheel. Accordingly, as the foot lever is forced forwardly by the operator, the pawl and link assembly illustrated in dot and dash lines in FIG. 3 moves forwardly, toward the left, bringing the pawl into engagement with one of the teeth of the sprocket wheel. Continued movement of the assembly to the full line position illustrated in FIG. 3 effects counterclockwise rotation of the sprocket wheel and consequent counterclockwise rotation of the associated rear drive wheel, or both drive wheels when they are interconnected by a common shaft 50. Upon retraction of the operator's foot, the associated foot lever is returned rearwardly, by means of the associated spring 84, and the pawl assembly is moved toward the right in FIG. 3 to the dot and dash line position illustrated.

The ratchet drive assembly described functions effectively to propel the vehicle over soft ground positively and with minimum physical effort. The two foot levers may be operated in unison, or sequentially, as desired. Each operation of a foot lever effects only a partial revolution of the sprocket wheel and consequent movement of the vehicle only for a short distance. This provides the operator with the degree of control of movement of the vehicle desired for use in the servicing and harvesting of strawberries and other similar crops.

In this regard it is to be understood that the vehicle will be positioned to straddle a row of strawberries or similar crop. The operator bends forwardly and extends his hands through the intermediate opening in the vehicle body, between his legs, to perform the necessary operations of weeding, harvesting, etc.

Having now described our invention and the manner in which it may be used, we claim:

1. A self-propelled produce harvesting vehicle, comprising:
   (a) a body supported on front steering wheels and rear drive wheels and having a seat at the rearward end and a shelf at the forward end, the space between the seat and shelf being open,
   (b) a ratchet type sprocket wheel secured for rotation with at least one of the drive wheels,
   (c) a pawl associated with the sprocket wheel,
   (d) a pawl support arm,
   (e) a lever mounting the support arm pivotally for engagement of the pawl releasably with the sprocket wheel,
   (f) pivot means mounting the lever for pivotal movement relative to the sprocket wheel,
   (g) a foot pedal mounted pivotally on the body, and
   (h) link means interconnecting the foot pedal and lever.

2. The vehicle of claim 1 wherein the pawl support arm is mounted on the lever for pivotal movement on an axis disposed forwardly of the longitudinal center of balance of the support arm and the pawl is mounted on the support arm rearwardly of said pivot axis.

3. The vehicle of claim 1 wherein the pawl support arm is U-shape in cross section and receives the sprocket wheel freely through the open side thereof, and the pawl traverses the open space of the arm.

4. The vehicle of claim 1 including resilient means operatively interengaging the foot pedal and body and urging the foot pedal to a rearward position of movement.

References Cited

UNITED STATES PATENTS

| | | | |
|---|---|---|---|
| 613,028 | 10/1898 | Duvall | 280—32.5 X |
| 1,595,462 | 8/1926 | Gardner | 280—255 |
| 1,745,111 | 1/1930 | Norman | 280—255 X |
| 2,317,606 | 4/1943 | Harris | 280—32.5 |

KENNETH H. BETTS, *Primary Examiner.*

U.S. Cl. X.R.

74—142; 280—32.5, 271